Figure 1:
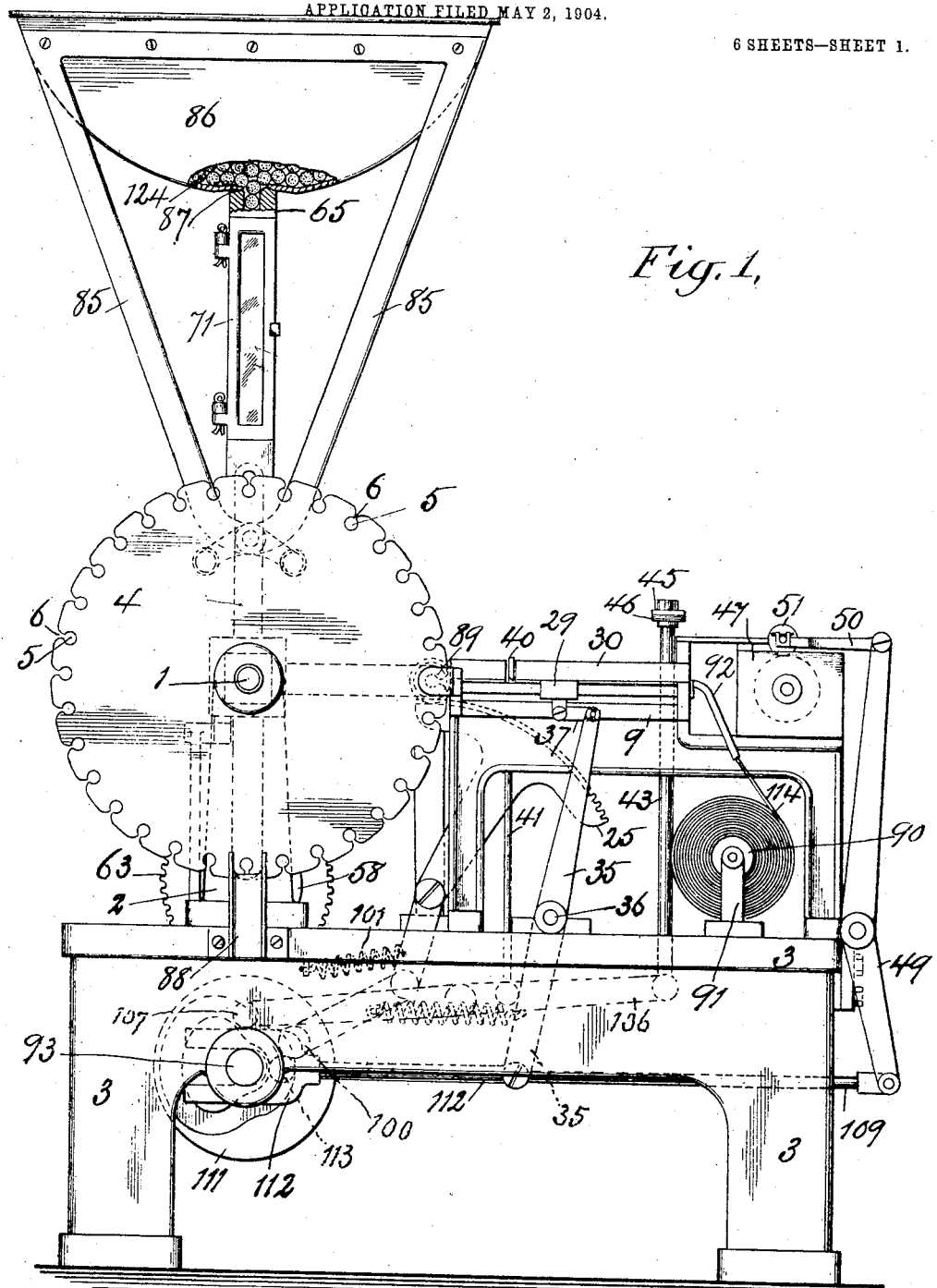

No. 779,688. PATENTED JAN. 10, 1905.
G. P. BUTLER.
MACHINE FOR MAKING AND APPLYING MOUTHPIECES TO CIGARETTES OR CIGARS.
APPLICATION FILED MAY 2, 1904.

6 SHEETS—SHEET 2.

WITNESSES
John O. Gempler.
Geo. M. Harris.

INVENTOR
George P. Butler
BY Kenyon & Kenyon
his ATTORNEYS.

No. 779,688. PATENTED JAN. 10, 1905.
G. P. BUTLER.
MACHINE FOR MAKING AND APPLYING MOUTHPIECES TO CIGARETTES OR CIGARS.
APPLICATION FILED MAY 2, 1904.

6 SHEETS—SHEET 3.

WITNESSES:
John O. Gempler.
Geo. M. Harris.

INVENTOR
George P. Butler
BY Kenyon & Kenyon
his ATTORNEYS

No. 779,688. PATENTED JAN. 10, 1905.
G. P. BUTLER.
MACHINE FOR MAKING AND APPLYING MOUTHPIECES TO CIGARETTES OR CIGARS.
APPLICATION FILED MAY 2, 1904.
6 SHEETS—SHEET 4.
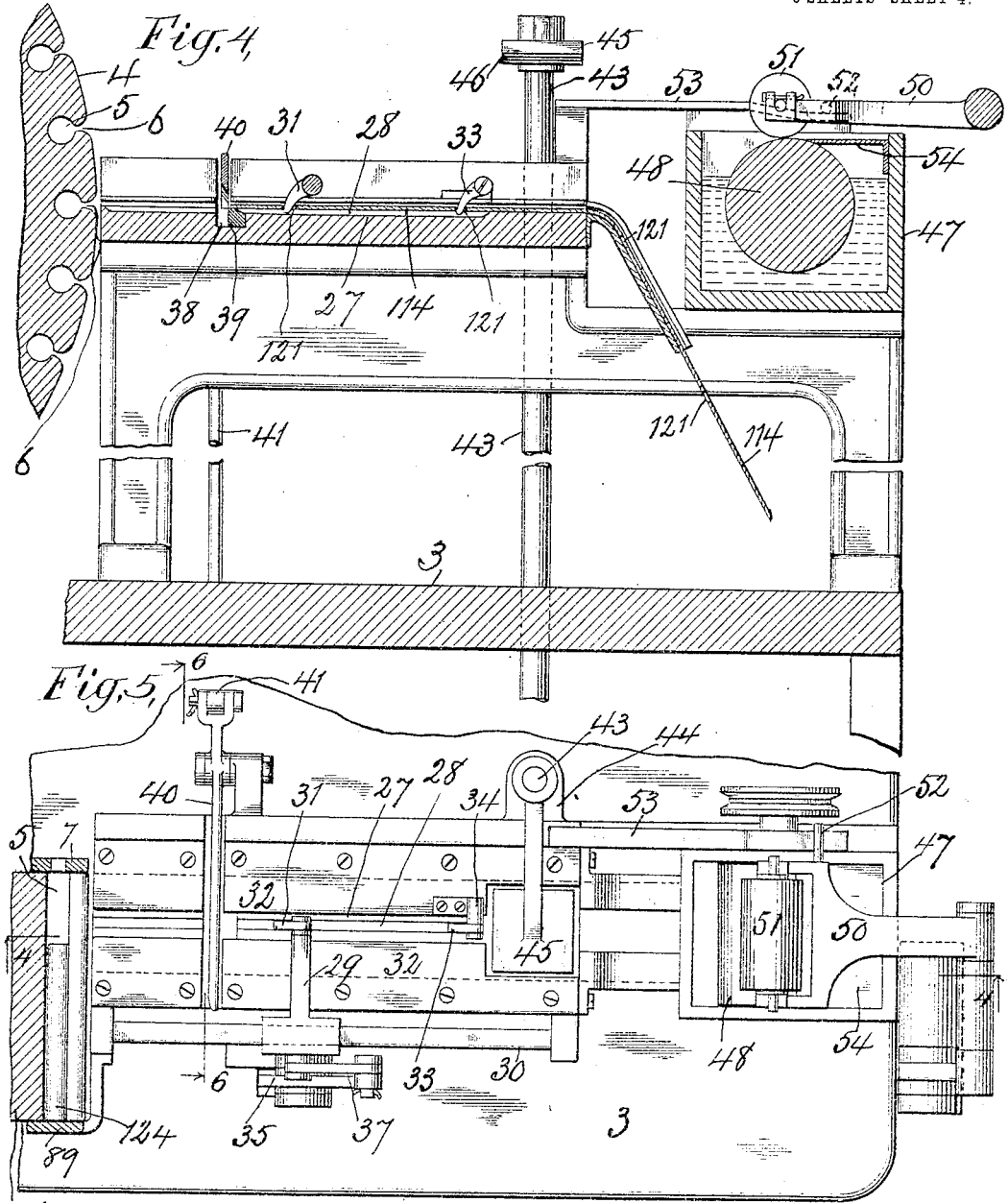
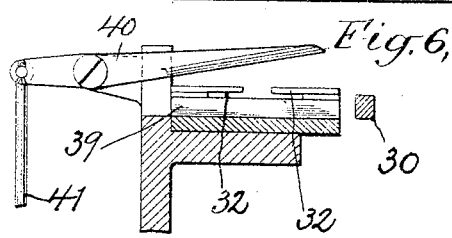
WITNESSES:
John C. Templer.
Geo. M. Harris.
INVENTOR
George P. Butler
BY Kenyon & Kenyon
his ATTORNEYS.

No. 779,688. PATENTED JAN. 10, 1905.
G. P. BUTLER.
MACHINE FOR MAKING AND APPLYING MOUTHPIECES TO CIGARETTES OR CIGARS.
APPLICATION FILED MAY 2, 1904.

6 SHEETS—SHEET 5.

WITNESSES:
John O. Gempler.
Geo. M. Harris.

INVENTOR
George P. Butler
BY Kenyon & Kenyon
his ATTORNEYS.

No. 779,688. PATENTED JAN. 10, 1905.
G. P. BUTLER.
MACHINE FOR MAKING AND APPLYING MOUTHPIECES TO CIGARETTES OR CIGARS.
APPLICATION FILED MAY 2, 1904.
6 SHEETS—SHEET 6.
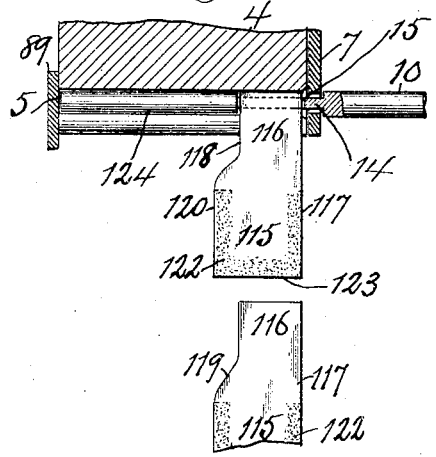
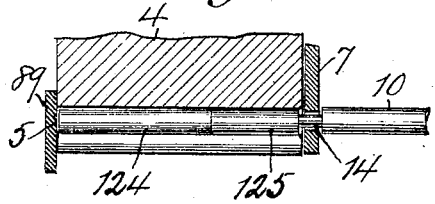
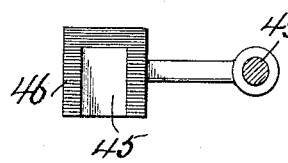
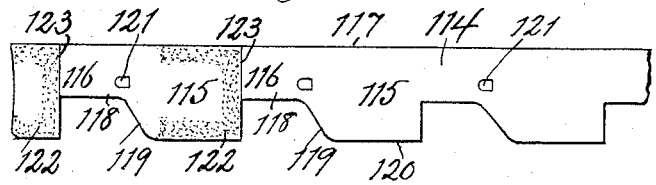
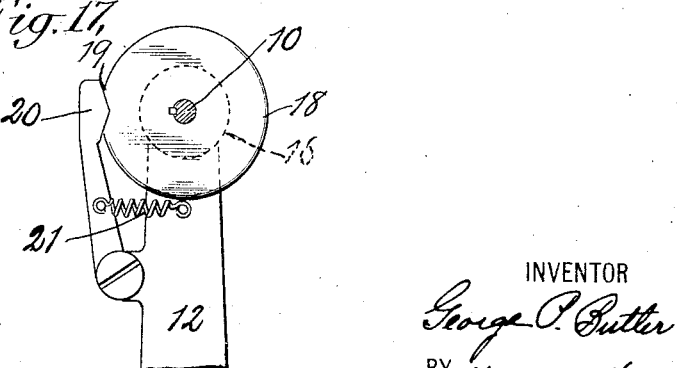
WITNESSES:
John O. Gempler.
Geo. M. Harris.
INVENTOR
George P. Butler
BY Kenyon & Kenyon
his ATTORNEYS No. 779,688.                                    Patented January 10, 1905.

UNITED STATES PATENT OFFICE.

GEORGE PIERCE BUTLER, OF NEW YORK, N. Y., ASSIGNOR TO STANDARD MOUTH PIECE MACHINE COMPANY, OF NEW YORK, N. Y., A CORPORATION OF NEW YORK.

MACHINE FOR MAKING AND APPLYING MOUTHPIECES TO CIGARETTES OR CIGARS.

SPECIFICATION forming part of Letters Patent No. 779,688, dated January 10, 1905.

Application filed May 2, 1904. Serial No. 205,968.

*To all whom it may concern:*

Be it known that I, GEORGE PIERCE BUTLER, a citizen of the United States, and a resident of the city of New York, county and State of New York, have invented new and useful Improvements in Machines for Making and Applying Mouthpieces to Cigarettes or Cigars, of which the following is a specification.

My invention relates to machines for making mouthpieces for cigarettes or cigars and for applying the mouthpieces to cigarettes or cigars.

My invention is particularly applicable for making mouthpieces from strips of flexible material and for applying said mouthpieces to cigarettes or cigars.

The object of my invention is to provide simple and efficient means for forming mouthpieces for cigarettes or cigars out of strips of flexible material, also means for applying mouthpieces formed from strips of flexible material to the ends of cigarettes or cigars with a portion of said mouthpiece surrounding the cigarette or cigar, and particularly by winding and forming said mouthpiece upon the cigarette or cigar.

My invention consists in the apparatus and separate parts and devices and combination of parts and devices, as hereinafter described and shown.

Figure 2:
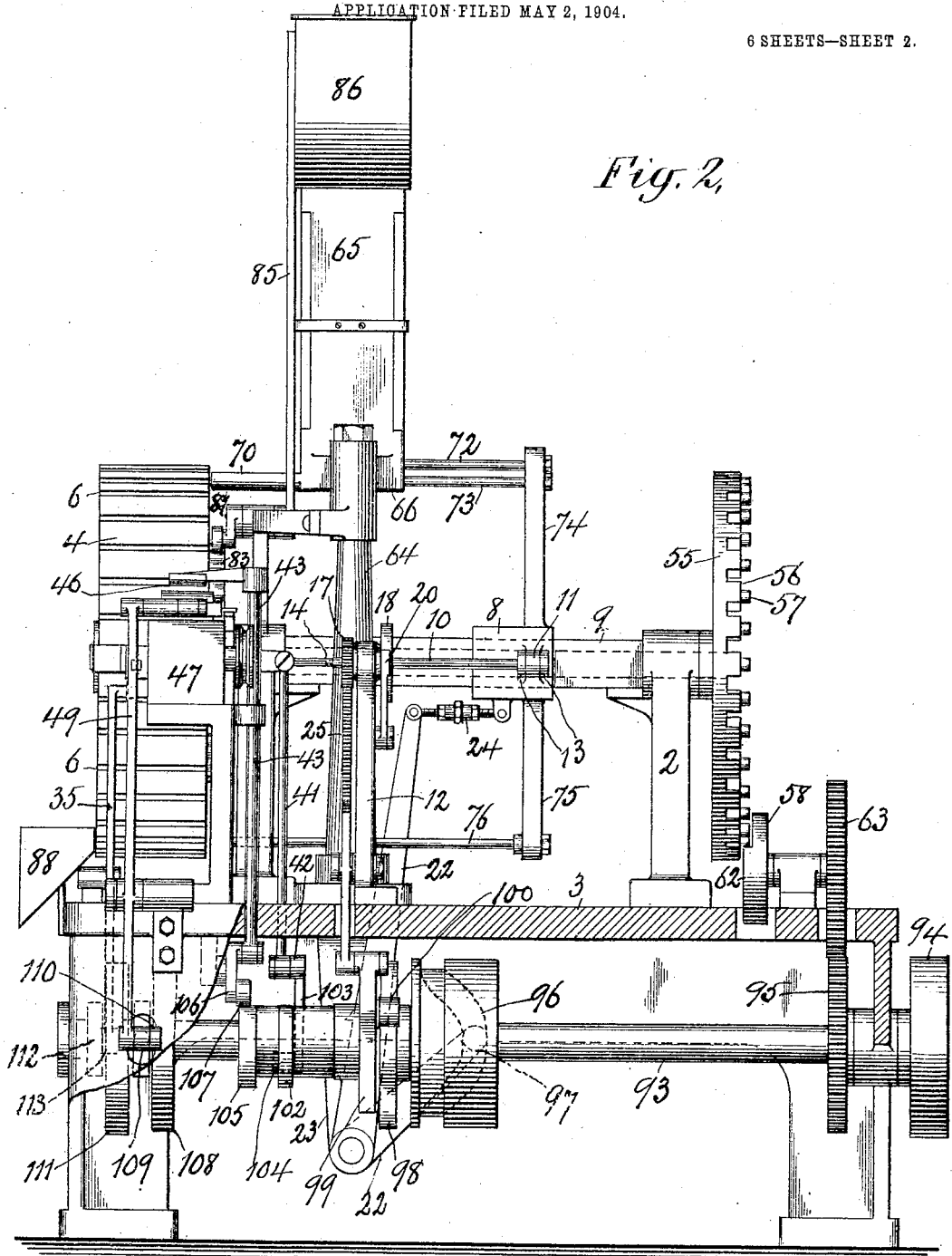
Figure 3:
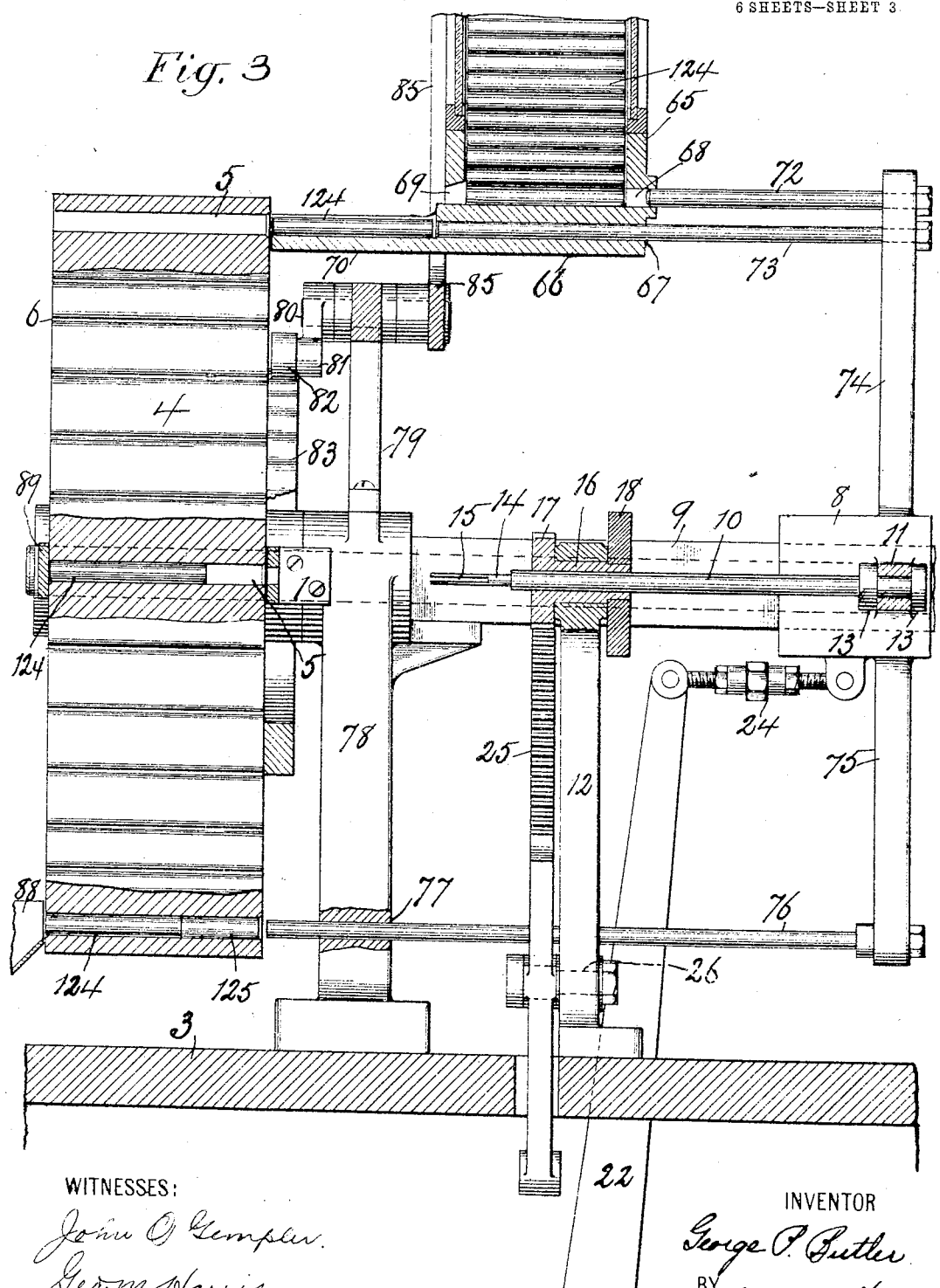
Figure 7:
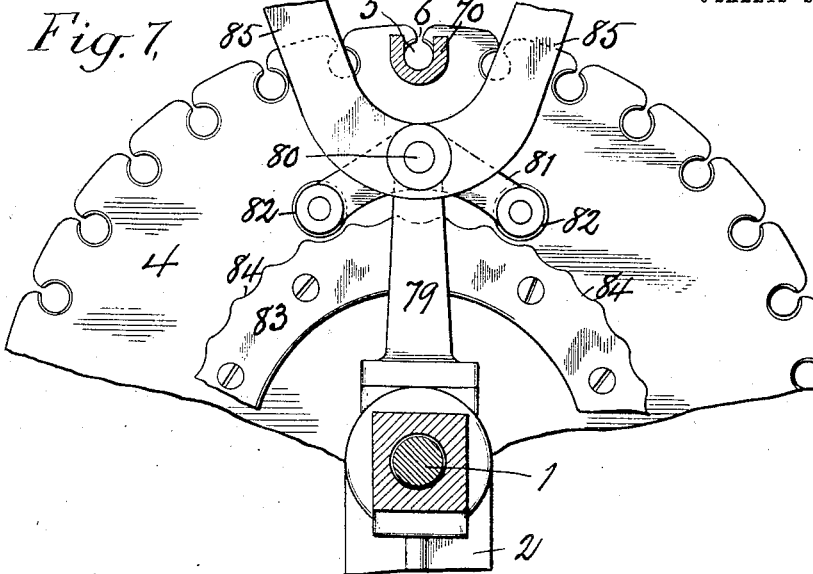
Figure 8:
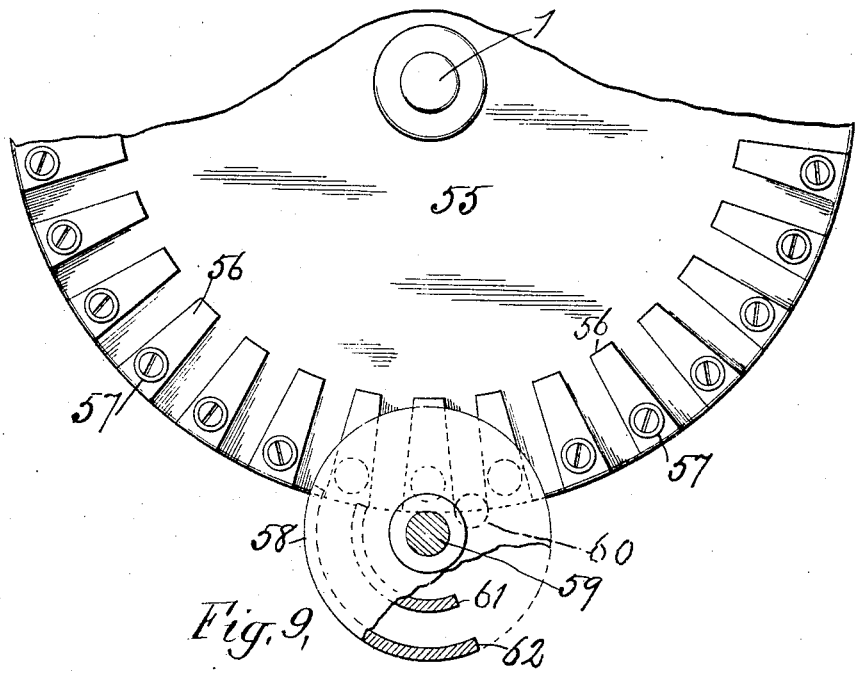
Figure 9:
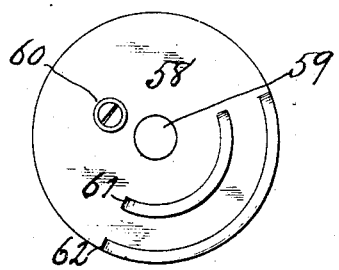

In the accompanying drawings, Figure 1 illustrates a front elevation of a machine illustrating one embodiment of my invention, omitting some of the details which are shown in the other figures to prevent confusion. Fig. 2 is a side elevation of the apparatus shown in Fig. 1, but omitting some of the parts of said figure and illustrating other parts that are not shown in Fig. 1. Fig. 3 is a vertical section, much enlarged, of the cigarette holding and feeding devices and of the mouthpiece-forming devices. Fig. 4 is a vertical section, much enlarged, of the means for feeding the strip of flexible material to the cigarette or cigar holder and of the devices for applying the adhesive to said strip, said section being on the line 4 4 of Fig. 5. Fig. 5 is a plan view of the parts shown in Fig. 4. Fig. 6 is a detail view of the means for severing the flexible strips into proper lengths for the mouthpieces, being a transverse section of a part of the apparatus through the line 6 6 of Fig. 5. Fig. 7 is a detail, greatly enlarged, of the device for holding the cigarettes or cigars while the mouthpieces are being applied thereto and of a few of the parts near the top of said holder. Figs. 8 and 9 are details, greatly enlarged, of the means for operating the cigarette-holder shown in Fig. 7. Figs. 10, 11, and 12 are detail views showing the manner of forming the mouthpiece by winding it upon the end of a cigarette or cigar, said figures showing, respectively, three successive steps of said operation. Fig. 13 is a longitudinal section illustrating a cigarette with a mouthpiece wound thereon. Fig. 14 illustrates a transverse section, greatly enlarged, of the mouthpiece shown in Fig. 13 looking in the direction of the arrows. Fig. 15 is an under side view of the device for applying an adhesive to the strips of flexible material for making the mouthpieces. Fig. 16 illustrates a portion of a strip of flexible material from which the mouthpieces are made with an adhesive applied to two of the mouthpiece portions of said strip. Fig. 17 is a detail of the means for causing the former of the mouthpiece to accurately register with the cigarette or cigar holder.

Similar numbers represent like parts in all the figures.

1 is a shaft journaled in standards 2 of the frame 3 of the machine. Secured to the front end of the shaft 1 outside of its adjacent standard 2 is a cylinder 4. This cylinder is provided with transverse holes 5 near its periphery and preferably at regular distances apart and also preferably arrranged in the circumference of a circle. These holes 5 have a diameter a little larger than that of an ordinary cigarette, so that the cigarettes can be readily slid into and out of them, but not too loosely. The holes 5 are parallel with the shaft 1, and the width of the cylinder 4, as also the length of the holes 5, should be a little greater than the length of an ordinary cigarette—that is, about enough greater for the length of a mouthpiece. The periphery of the cylinder 4 is provided with slits 6, extending longitudinally of the holes 5 and from said periphery into said holes.

7 is a right-angled plate secured to a fixed portion of the frame 3 of the machine, one side of said piece being adjacent to the inner side of the cylinder 4 and provided with a transverse hole, having a diameter less than the holes 5 and of about or less than the diameter of an ordinary cigarette. This plate 7, with its hole, is a stripper for permitting the former of the mouthpiece after it has formed the mouthpiece on the cigarette in a hole 5 in the cylinder to be withdrawn from said hole 5 without withdrawing any part of the mouthpiece from said hole.

8 is a sliding block constructed to move and be guided horizontally on the horizontal bar 9 of the machine-frame.

10 is a shaft journaled near one end in a bearing 11 on the block 8. 12 is a standard for supporting the other journal-bearings of the shaft 10, and 13 13 are collars secured to the shaft 10 on either side of the bearing 11, so as to insure the horizontal movement of the shaft 10 with the block 8. The shaft 10 is provided with a spindle 14 on its inner end, and the free end of said spindle is provided with a slot 15.

16 is a rotary sleeve supported in journal-bearings in the standard 12 and surrounding the shaft 10.

17 is a pinion secured to or forming part of the sleeve 16.

18 is a wheel secured to the sleeve 16 and provided with a notch 19 in its periphery, preferably cut at an oblique angle.

20 is a dog pivoted to the standard 12 and having its operating portion constructed to fit the notch 19 of the wheel 18, and 21 is a spring keeping the dog 20 in constant yielding pressure with the periphery of the wheel 18 or in register with notch 19. (See Fig. 17.)

22 is a bell-crank lever pivoted to a hanger 23, extending from the base-plate of the frame 3 and having its upper arm secured by an adjustable pivotal link 24 with the sliding block 8.

25 is a segmental rack-lever pivoted to rock-shaft 26, the rack of said lever engaging with the pinion 17.

27 is a bed and guideway for the paper strip from which the mouthpieces for the cigarettes are to be made. This guideway 27 extends, substantially, at right angles to the axis of the cylinder 4, and its inner end terminates near the periphery of said cylinder.

28 is a longitudinal groove in the bed 27 for a purpose hereinafter to be described.

29 is a sliding piece supported by and constructed to slide upon guideway 30, which is parallel with the groove 28.

31 is a finger loosely pivoted or hung upon piece 29 and which drops down into the groove 28.

32 32 are horizontal guide-plates to keep the strip of paper down in place on the bed 27 and from buckling up on said bed. The inner edges of these plates 32 do not extend quite to the groove 28.

33 is a loosely-swinging dog suspended to a bracket 34 on one of the plates 32, said dog dropping loosely into the groove 28.

35 is a lever fulcrumed at 36 to the frame 3 at or near its bed-plate and having its upper arm connected by link 37 with the sliding piece 29.

38 is a transverse groove in the bed 27, in which is secured the lower fixed blade 39 of the shears for severing the paper that is fed along the bed 27.

40 is the movable blade of the shears, which is in the form of a lever, having its operating-arm connected by a rod 41 with operating-lever 42.

43 is a vertically-sliding rod supported in bearings in the bed-plate of the frame 3 and in a fixed sleeve or bracket 44 at a point near the rear end of the bed 27.

45 is a horizontal block secured near the upper end of the rod 43 and extending over the bed 27. Secured to the under side of said block 45 is a pad 46 for carrying an adhesive. This pad is preferably of the form shown in Fig. 15, extending around three sides of said block. The block 45, with pad 46, is adapted to be operated by rod 43, so that said pad can be forced down upon the bed 27 or whatever rests upon said bed and then be lifted from the same.

47 is a tank for containing paste or other liquid adhesive, and 48 is a roller with its shaft journaled in the sides of said tank and adapted by its revolution to carry the adhesive on its periphery.

49 is a lever pivoted to the frame 3 of the machine at a point back of the tank 47, and to the upper arm of said lever is pivoted a forwardly-extending arm 50, and upon the forward end of which is loosely journaled a lazy-roller 51, which rests upon the roller 48.

52 is a pin or projection extending out from the arm 50 and resting upon a track 53, which extends forward to a plane crossing that of the block 45, said track 53 being for the purpose of supporting and guiding the roller 51 during its movement and that of the arm 50, with pin 52, backward and forward. The track 53 and the roller 51 should be so constructed that when the block 45 is in its uppermost position the roller 51 can slide under the pad 46 and make tangential contact therewith, so that the adhesive which has been transmitted to the roller 51 from the roller 48 will be transmitted to the pad 46.

54 is a scraping-blade secured to the back wall of the tank 47 and extending somewhat tangentially over the periphery of the roller 48 to take off the excess adhesive from the periphery of said roller before it comes in contact with the roller 51.

55 is a wheel secured to the shaft 1 of the cylinder 4. Said wheel is provided on one of its faces, preferably the outer one, with radially-disposed ribs 56, arranged around the periphery of said wheel, so as to leave corresponding radially-disposed grooves between said ribs. Extending outward from each rib is a small roller 57, said rollers being arranged concentrically to the shaft 1.

58 is a disk journaled upon shaft 59 above the bed-plate of the frame 3. The face of said disk that is adjacent to the wheel 54 is provided with a small roller 60, having a diameter a little less than the width of the grooves between the ribs 56, and during the revolution of the disk 58 the roller 60 is adapted to ride between two adjacent ribs 56, and thereby slightly turn the wheel 55 and correspondingly turn the shaft 1 and the cylinder 4. Upon the same face of the disk 58 with the roller 60, but on the opposite side of shaft 59, are two concentric ribs 61 and 62, so arranged and constructed that upon the rotation of the disk 58 said ribs will span one of the rollers 57 on the wheel 55 when at such time the roller 60 on the disk 58 is not in one of the grooves of the wheel 55, these ribs 61 62 thus serving as guides to the registering and entering of the roller 60 in said grooves.

63 is a pinion secured to the shaft 59, through which pinion the disk 58 is revolved.

64 is a standard extending upward from the bed-plate of the frame 3 and supporting a vertical magazine 65 for containing and feeding the cigarettes to the holes or chambers 5 in the cylinder 4. This magazine 65 is of a length extending in the direction of the chambers 5 a little longer than an ordinary cigarette and of a breadth slightly greater than the diameter of an ordinary cigarette. The bottom 66 of said holder is perforated longitudinally, forming the bore 67 in lines parallel to the chambers 5 for a purpose hereinafter to be described.

68 and 69 are perforations in the back and front walls, respectively, of the magizine 65, the perforation 69 being immediately adjacent to the bottom 66 and of sufficient diameter to admit of an ordinary cigarette readily passing through said perforation.

70 is a forward extension of the bottom 66, having upwardly-extending sides and forming a recessed tray or socket for the cigarettes that are forced through the opening 69 in the magazine to drop into. This tray should of course be of a length slightly greater than that of a cigarette, so that the cigarette can drop freely into it. Said tray should also be in the line of rotation with the chambers 5, so that they may register with the tray 70 and so that the cigarettes from the tray may be forced into the holders.

The front of the magazine is provided with a hinged door 71 to permit of access to the magazine for the placing of cigarettes into the magazine, if desired to do so in such manner, or to remove them therefrom, or to straighten them in the magazine in the proper order, or for any other purpose desired.

72 and 73 are rods secured to and extending forward from an arm 74, that extends upward from the block 8. The forward end of the rod 72 fits loosely in the opening 68 and is adapted to slide freely back and forth therein and in the magazine, and the rod 73 fits loosely in the bore 67 of the bottom 66 and is adapted to slide freely back and forth therein and in the tray 70.

75 is an arm extending downward from the block 8, and extending forward from said arm is a rod 76, which passes loosely through a hole 77 in standard 78 and is adapted to slide back and forth freely in said hole and in chambers 5.

79 is a standard extending upward from the horizontal cross-bar 9 of the machine-frame and has near its upper end journal-bearings for rock-shaft 80.

81 is a rock-lever having two downwardly-extending arms, on the lower end of each of which is a roller 82.

83 is a ring secured to the inner side of the cylinder 4 concentrically with its axis, and having its periphery formed into arched recesses 84, conforming to the arches of the peripheries of the rollers 82 and with which said rollers are adapted to register.

85 is an upwardly-extending frame supported near its lower end by rock-shaft 80 and supporting at its upper end a hopper 86, having its front and back walls about on the same plane with the front and back walls of the magazine 65 and an opening 87 in its bottom of a slightly greater width than the width of the interior of the magazine, as shown in Fig. 1. The rotation of the cylinder 4 will cause the projections between the recesses 84 and ring 83 to strike against the rollers 82 and to oscillate the frame 85 and the hopper 86 back and forth, so as to cause any cigarettes which may be in the hopper extending endwise from the front to the back walls of the same to be shaken, so as to drop one over the other into the chute 65.

88 is a chute extending from the front of the cylinder 4 opposite the rod 76 for the purpose of receiving and guiding the cigarettes after the mouthpiece has been applied to them and when they are forced out from the holders by said rod.

89 is a plate secured to the fixed part of the machine adjacent to the front of the cylinder 4 and opposite stripper 7 to cover up the outer ends of the chambers 5 when they are registering with the stripper 7, so that there will be sufficient resistance to permit the spindle 14 to properly wind the paper on the cigarette and during the forward and rotary movement of the spindle.

90 is a reel supported on standards 91 and on which a long strip of paper may be wound, from which strip the mouthpieces for the cigarettes are made.

92 is a trough extending from a point above the reel to the base of the bed 27, and which trough serves as a guide for the paper to said bed.

93 is the driving-shaft of the machine and which extends under the bed-plate of the same, and 94 is a driving-pulley which is secured to said shaft outside of its frame.

95 is a gear secured to the shaft 93 and engaging with pinion 63.

96 is a race-cam secured to shaft 93 and which is adapted to cause a rocking movement of the lever 22 through roller 97 on the lower arm of said lever and which rocking movement causes the reciprocation of the block 8, the shaft 10, and spindle 14.

98 is a peripheral cam also secured to the shaft 93.

99 is a yoke pivoted to the lower arm of the rack-lever and spanning the shaft 93 and provided with a roller 100, which is caused to bear against the periphery of the cam by means of a spring 101, connected with the frame of the machine and with the cam-lever, so that when the cam 98 revolves, the segmental rack 25 will be caused to rock and rotate the pinion 17.

102 is a peripheral cam secured to the shaft 93. One arm of the lever 42 is pivoted to the rod 41, and the other arm, 103, of said lever is provided with a roller 104, which bears against that portion of the cam 102 below the shaft 93, so that when said roller is operated upon by the cam the rod 41 will be raised and the blade 40 will sever the paper.

105 is a peripheral cam secured to the shaft 93, and 106 is a lever one arm of which is pivoted to the rod 43 and the other arm of which is provided with a roller 107, which bears upon the cam 105, so that when said cam raises the roller 107 the lever 106 will cause the rod 43 and the rod 45 and pad 46 to descend upon the bed 27 or whatever is thereupon.

108 is a face or race cam secured to the shaft 93, and 109 is a yoke spanning the shaft 93 and provided with a roller 110, which engages and is adapted to move in the race of said cam, the shank of said yoke being pivoted to the lever 49, so that upon the rotation of the shaft 93 and the cam 108 the lever 49 will be caused to rock and move the adhesive-carrying roller 51 back and forth. 111 is another race-cam secured to the shaft 93, and 112 is a yoke spanning the shaft 93 and provided with a roller 113, engaging with and adapted to travel in the race or groove of said cam, so that when the shaft 93 and the cam 111 revolve the yoke and its arm 112 will cause the lever 35 to rock and to reciprocate the piece 29 and the finger 31, so as to carry the strip of paper forward and return back to its original position.

114 is a strip of paper or similar flexible material which is shown in Fig. 1 as wound upon reel 90. This strip 114 is preferably formed into sections of equal size, each section being formed into two parts 115 and 116, all of said sections having one continuous longitudinal line 117, and the part 116 of each section being narrower than the part 115. The edge of part 116 opposite and preferably parallel to edge 117 is united by the edge 119, preferably obliquely to the edge 120, which is that of the wider part 115 and opposite and preferably parallel with the edge 117. The strip 114 is also provided with perforations 121, preferably in the smaller end 116 of the sections or near said smaller end, as shown in Fig. 16, these perforations being for the purpose of permitting the feeding-finger 31 and dog 33 to pass through them, so that the paper can be fed forward by said finger.

122 indicates the adhesive that has been applied to the large end 115 of the section of the strip 114 by the pad 46.

123 indicates the lines on the strip 114, where the different sections of said strip are to be severed.

124 represents a cigarette, and 125 is the complete mouthpiece upon the cigarette.

The operation of the machine is as follows: A number of cigarettes are put into the hopper 86 with their ends extending front and back of the same—that is, one end being near the front wall and the other being near its back wall. The driving-shaft 93 is rotated, and through the rotation of the gears 95 and 63 and the disk 58 and its attachments, wheel 54 and its attachments, and the shaft 1 the cylinder 4 is rotated by a step-by-step movement and temporarily locked with one of the holes or chambers 5 opposite and registering with the trough 70, the hopper 86 being oscillated by means of the ring 83 and the rocking lever 81, so as to shake the cigarettes from the hopper down into the chute in proper order one over the other. The block 8 is then fed forward by means of the cam 96 and lever 22, so that rods 72, 73, and 76, and the shaft 10 will be forced forward, the rod 73 pushing any cigarettes which might have been in the trough 70 into the chamber 5 registering with it, the rod 72 forcing the lowest cigarette in the magazine 65 through the opening 69 down into the trough and resting on the rod 73. At the same time the rod 76 will have forced out any cigarette or cigarette and mouthpiece which may have been in the chamber 5 opposite the rod 76 and into the chute 86. At the same time also that these movements are taking place the spindle 14 will be forced forward through the hole in the stripper 7 into the chamber 5 that is registering with said stripper. While the above-stated operation is taking place the adhesive-carrying roller 51 is forced forward by means of the cam 108, lever 49, yoke and its arm 109, and the lever 50, so that said roller will slide under and in contact with the adhesive-carrying pad 46 and will then return to its normal position. Block 45 and pad 46 will then be caused to descend upon the paper that is on the bed 27, so as to transmit the adhesive to the paper, as shown in Figs. 10, 11, and 16. The block and pad will then be returned to their original positions. The long strip should be previously drawn upon the bed 27, so that the finger 31 and dog 33 will drop into the holes 121 of said strip. The piece 29 will then be forced forward by the cam 111, lever 35, the yoke and its arm 112, and link 37, and feed the paper forward under the cutter 40 and with the front edge passing through the slit 6 of one of the sockets 5, which is opposite the bed 27, and into and through the slot 15 of the spindle 14, which at this time is in said socket 5. The dog 33 simply acts as a stop to hold the paper from being pulled backward. The pivotal blade 40 of the shears is then forced down by means of the cam 102 and rod 41, so as to cut off a strip of paper sufficient to make a mouthpiece, severing the strip at the line 123 where the wider end 115 of a section joins the narrower portion 116 of the next adjacent section, as shown in Fig. 16. The segmental rack is then brought by means of its cam 98 and intermediate mechanism, so as to turn the pinion 17, shaft 10, and spindle 14, through the feather-and-groove connection with the sleeve 16, as shown in Fig. 17. To properly apply the strip 114 to the cigarette 124, said strip should be fed forward on its bed 27 with the finger 31 and the dog passing through the holes 121 of said strip. If the cigarette 124 be in the socket 5, which has its slit registering with the bed 27, when this strip 114 is fed forward by the finger 31 through the slit 6 into the socket and through the slot 15 of the shank 14 the longitudinal edge 118 of the end 116 of one of the sections of said strip will be adjacent to or abutting against one end of the cigarette, as shown in Fig. 10. Previously to the rotation of the shaft 10 and the spindle 14 the section of strip 114 which has had its small end 116 in the slit of hole 5 and in the slot of spindle 14, as shown in Fig. 10, has been severed along the line 123 and adhesive applied to the part 115 at 122 by the pad 46. A part of the strip 114, from which its sections are severed, is shown in Fig. 16. The rotation of the shaft 10 and the spindle 14 will first wind the part 116 upon said shank, and a continuation of said rotation will also wind the part 115 upon spindle 14, and the part of the end 115 containing the edge 120 beyond the edge 118 around the adjacent edge of the cigarette, there being enough of the section beyond the edge 118 to hold it when wound to the cigarette 124. The adhesive 122 will not only cause the wound sections to adhere to the end of a cigarette, but will also cause the outer wider portion 115 of the section to adhere in its wound position to the remainder of the section, and the part 116 will be the innermost wound portion, with the edge 118 abutting against the end of the cigarette, as shown in Fig. 13. During the winding of the section 115 116 upon the end of the cigarette, as above described, the different parts of the apparatus, including the cigarette 124 and the wound mouthpiece 125, will be in the position shown in Fig. 12, with the spindle 14 inclosed and surrounded by the wound mouthpiece 125. The shaft 10 and the spindle 14 will then be carried back, so that the end of part 116 of the mouthpiece 125 will be withdrawn through the end of the slot 15 of the spindle. The stripper 7, which overlaps the outer end of the wound section, and the completed mouthpiece 125 (see Fig. 12) will prevent any withdrawal of said mouthpiece from the cigarette 124 or from any loosening of the same from said cigarette. The above operations are repeated over and over again, so as to feed the cigarettes in all of the chambers 5 of the cylinder 4, and when any of the cigarettes in the holders 5 that have had the mouthpiece 125 applied to them have come opposite or register with the rod 76 said rod will be forced forward in the manner above described and will push out the cigarette having the mouthpiece thereon into the chute 88.

The above operations are repeated, and they may be repeated continuously as long as the machine is in operation and as long as there are cigarettes in the magazine 65 and a strip 114 upon reel 90 and with said strip properly fed along its bed 27. When the mouthpiece 125 has been applied to the cigarette 124 in the manner above described, the portion of the wound strip forming said mouthpiece between the edges 119 and 123 will be wound upon the end of the cigarette, the part 116 will be the center of the wound portion of the mouthpiece, and its edge 118 will abut against the inclosed end of the cigarette and form a dam to prevent the tobacco in the cigarette from being drawn into the mouth of the smoker. The relative positions of the cigarette 124 and the mouthpiece 125 and its parts is shown in Figs. 13 and 14. The different thicknesses of the mouthpiece 125 will give it the necessary rigidity, and it will be found that the mouthpiece and the cigarette are secured permanently together, so that the cigarette can be smoked clear down to its inner end without drawing any of the tobacco from the cigarette into the mouth and without getting the cigarette or mouthpiece disconnected or broken away from each other.

The mouthpieces can be made by my improved machine independently of their application to cigarettes, for it will be readily seen if there be no cigarettes in the recesses 5 of the cylinder 4 the section 115 116 of the strip 114 will be severed from said strip, formed into mouthpieces by being wound upon the spindle 14, stripped from the spindle by the stripper 7, and will be forced from the socket 5 into the chute 88 by the rod 76.

From the above it will be seen that by the use of my invention a great number of mouthpieces for cigarettes or cigars may be readily and quickly made from a strip of flexible material, also that such mouthpieces can be readily and quickly formed upon the cigarettes or cigars and in such manner as to prevent the tobacco from the cigarette or cigar being drawn through the mouthpiece into the mouth, and so that there will be no likelihood of breaking the cigarette or cigar at its connection with the mouthpiece.

My invention in its broader aspects is not limited to the precise construction described and shown, as many changes other than those suggested may be made without departing from the main principles of my invention or sacrificing its chief advantages.

What I claim as new, and desire to secure by Letters Patent, is—

1. In a machine for forming mouthpieces upon the ends of cigarettes or cigars, the combination of a holder for a cigarette or cigar and a mouthpiece beyond the same, a spindle, means for producing relative reciprocating movement between the holder and the spindle to cause the spindle to enter part way only into the holder and recede therefrom, and means for causing relative rotary motion between the holder and said spindle while the spindle is in the holder, whereby a strip of flexible material may be wound around a cigarette or cigar while in the holder with a part of said wound material extending beyond the same to form a mouthpiece.

2. In a machine for forming mouthpieces upon the ends of cigarettes or cigars, the combination of a holder for the cigarette or cigar and a mouthpiece beyond the same, a spindle, means for producing relative reciprocating movement between the holder and the spindle to cause the spindle to enter part way only into the holder and to recede therefrom, and means for causing the spindle to rotate while in said holder, whereby a strip of flexible material may be wound around the cigarette or cigar while in the holder with a part of said wound material extending beyond the same to form a mouthpiece.

3. In a machine for forming mouthpieces upon the ends of cigarettes or cigars, the combination of a holder for the cigarette or cigar and a mouthpiece beyond the same, a spindle, means for producing relative reciprocating movement between the holder and the spindle to cause the spindle to enter part way only into the holder longitudinally and to recede therefrom, and means for causing the spindle to rotate while in said holder, whereby a strip of flexible material may be wound around the cigarette or cigar while in the holder with a part of said wound material extending beyond the same to form a mouthpiece.

4. In a machine for forming mouthpieces upon the ends of cigarettes or cigars, the combination of a holder for the cigarette or cigar and a mouthpiece beyond the same, a spindle having reciprocating motion part way only into and out of said holder, and also having rotary motion while in said holder, whereby a strip of flexible material may be wound around the cigarette or cigar while in the holder with a part of said wound material extending beyond the same to form a mouthpiece.

5. In a machine for forming mouthpieces upon the ends of cigarettes or cigars, the combination of a holder for the cigarette or cigar and a mouthpiece beyond the same, a spindle, means for causing relative reciprocating movement between the holder and the spindle to cause the spindle to enter part way only into the holder and recede therefrom, means for causing the spindle to rotate while in said holder, and means for holding said strip during the receding movement between the holder and the spindle, whereby a strip of flexible material may be wound around the cigarette or cigar while in the holder with a part of said wound material extending beyond the same to form a mouthpiece.

6. In a machine for forming mouthpieces upon the ends of cigarettes or cigars, the combination of a plurality of holders for respectively supporting a single cigarette or cigar and a mouthpiece beyond the same, a spindle, means for feeding a strip of flexible material to said spindle, means for moving the respective holders to register with said spindle, means for producing relative reciprocating movement between the holders and the spindle to cause the spindle to enter part way only into the holders and recede therefrom, and means for causing the spindle to rotate while in said holder, all as and for the purposes set forth.

7. In a machine for forming mouthpieces upon the ends of cigarettes or cigars, the combination of a device provided with a plurality of holders for respectively supporting a cigarette or cigar and a mouthpiece beyond the same, a spindle constructed to enter into said holders respectively, means for feeding the strip of flexible material to said spindle, means for moving said device to bring the respective holders to register with said spindle, means for producing relative reciprocating movement between said device and spindle to cause the spindle to enter part way only into said holders and recede therefrom, and means for producing relative motion between the holders and the spindle while the spindle is in a holder, all as and for the purposes set forth.

8. In a machine for forming mouthpieces upon the ends of cigarettes or cigars, the combination of a rotatable device provided with a plurality of holders arranged near the periphery of said device and for respectively supporting a cigarette or cigar and a mouthpiece beyond the same, a spindle constructed to enter said holders respectively, means for feeding the strip of flexible material to said spindle, means for turning said device to bring the respective holders to register with said spindle, means for producing relative reciprocating movement between said device and spindle to cause the spindle to enter part way only into said holders and recede therefrom, and means for producing relative motion between the holders and the spindle while the spindle is in a holder, all as and for the purposes set forth.

9. In a machine for forming mouthpieces upon the ends of cigarettes or cigars, the combination of a holder for a cigarette or cigar and a mouthpiece beyond the same, a spindle, means for producing relative reciprocating movement between the holder and the spindle to cause the spindle to enter part way only into the holder and to recede therefrom, and means for causing the spindle to rotate while in said holder, whereby a strip of flexible material may be wound around a cigarette or cigar while in the holder with a part of said wound material extending beyond the same to form a mouthpiece, and means for discharging the cigarette or cigar with its mouthpiece from the holder.

10. In a machine for forming mouthpieces upon the ends of cigarettes or cigars, the combination of a holder for the cigarette or cigar and a mouthpiece beyond the same, means for forcing a cigarette or cigar endwise into said holder, a spindle, means for producing relative reciprocating movement between the holder and the spindle to cause the spindle to enter part way only into the holder and recede therefrom, and means for causing relative rotary motion between the holder and the spindle while the spindle is in the holder, whereby a strip of flexible material may be wound around the cigarette or cigar while in the holder with a part of said wound material extending beyond the same to form a mouthpiece.

11. In a machine for forming mouthpieces upon the ends of cigarettes or cigars, the combination of a holder for the cigarette or cigar and a mouthpiece beyond the same, a magazine for cigarettes or cigars, means for feeding the cigarettes or cigars endwise from the magazine into said holder, a spindle, means for producing relative reciprocating movement between the holder and the spindle to cause the spindle to enter part way only into the holder and recede therefrom, and means for causing relative rotary motion between the holder and the spindle while the spindle is in the holder, whereby a strip of flexible material may be wound around the cigarette or cigar while in the holder with a part of said wound material extending beyond the same to form a mouthpiece.

12. In combination with a holder comprising a plurality of sockets for holding cigarettes or cigars and a mouthpiece beyond the same, a reciprocating and rotary spindle for entering part way into the sockets respectively, a reciprocating rod and means for causing it to register with one socket while the spindle registers with another socket, whereby said rod may push a cigarette or cigar into one socket, while the spindle enters part way only into another socket to wind a mouthpiece on a cigarette or cigar in said socket.

13. In combination with a holder comprising a plurality of sockets for holding cigarettes or cigars and a mouthpiece beyond the same, a device having reciprocating movement toward and away from said holder, and a rod and rotary spindle supported by said device and adapted to register with two of said sockets respectively, and the spindle adapted to enter part way only into its respective socket, whereby said rod may push a cigarette or cigar into one socket, while the spindle enters part way into another socket to wind a mouthpiece on a cigarette or cigar in said socket.

14. In combination with a holder comprising a plurality of sockets for holding cigarettes or cigars and a mouthpiece beyond the same, a reciprocating and rotary spindle for entering part way only into the sockets and a reciprocating rod, and said spindle and rod being arranged to enter respective sockets, whereby said rod may push out whatever is in the socket that it enters, while the spindle enters part way into another socket and rotates within the same, all as and for the purposes set forth.

15. In combination with a holder comprising a plurality of sockets for holding cigarettes or cigars and a mouthpiece beyond the same, a device having reciprocating movement toward and away from said holder, and a rotary spindle for entering part way only into the socket and a rod supported by said device and adapted to enter the respective sockets, whereby said rod may push out whatever is in the socket that it enters, while the spindle enters part way into another socket and rotates within the same, all as and for the purposes set forth.

16. In combination with a holder comprising a plurality of sockets for holding cigarettes or cigars and a mouthpiece beyond the same, a device having reciprocating movement toward and away from said holder, and two rods and a rotary spindle supported by said device and adapted to register with three of said sockets respectively, and one rod adapted to enter one socket while the spindle enters part way only into another socket, whereby one of said rods may push a cigarette or cigar into a socket, the other rod push out whatever is in the socket that it enters, and the spindle enter part way into the third socket and rotate within the same, all as and for the purposes set forth.

17. In combination with a socket for a cigarette or cigar, the reciprocating rotary spindle for entering said socket and rotating within the same, and a stop adjacent to the end of said socket opposite to that of the spindle, all as and for the purposes set forth.

18. In combination with a movable holder or socket for a cigarette or cigar, a magazine arranged near said holder for the cigarettes or cigars, a trough or other support for holding the cigarettes or cigars between the holder and the magazine, and said magazine provided with an opening adjacent to said trough for the passage endwise of the cigarettes or cigars from the magazine, means for pushing the cigarettes or cigars endwise from the magazine through said opening, whereby they may drop into the trough, means for causing the movable holder to register with said trough, and means for forcing the cigarettes or cigars that may be in the trough into said holder.

19. The mechanism for feeding a strip of flexible material along a bed to a holder for a cigarette or cigar, consisting of a sliding piece supported in guideways longitudinally of said bed, a finger suspended from said sliding piece into said bed and constructed to engage with the flexible material on said bed, and means for intermittently moving said sliding piece along said guideways, whereby the finger may feed the flexible material when the sliding piece moves in one direction, and ride over the flexible material when the sliding piece moves in the opposite direction.

20. The mechanism for feeding a strip of flexible material along a bed to a holder for a cigarette or cigar, consisting of a sliding piece supported in guideways longitudinally of said bed, a finger suspended from said sliding piece into said bed and constructed to engage with the flexible material on said bed, means for intermittently moving said sliding piece along said guideways, whereby the finger may feed the flexible material when the sliding piece moves in one direction, and ride over the flexible material when the sliding piece moves in the opposite direction, and a dog suspended over said bed and adapted to engage with the flexible material on the same, whereby said material may be prevented from slipping in one direction, but allowed to pass under said dog when moving in the opposite direction.

21. In combination with the vertical magazine for the cigarettes or cigars, a chute disposed above said magazine, and a frame supporting said chute and extending below the same, a rock-shaft secured to the lower portion of said chute, and means for giving said shaft a vibrating or rocking movement.

22. In combination with the vertical magazine for the cigarettes or cigars, a chute disposed above said magazine, and a frame supporting said chute and extending below the same, a rock-shaft and two arms 81 secured to said shaft, and a ring having indentations in its periphery for engaging alternately with said arms.

23. In a machine for forming mouthpieces upon the ends of cigarettes or cigars, the combination of a holder for a cigarette or cigar and a mouthpiece beyond the same, a slotted-ended spindle for entering and withdrawing from said holder, means for causing relative rotary motion between the holder and the spindle, means for introducing into the side of the holder a strip of flexible material narrower at one portion than at another, whereby the narrower portion of said strip may be passed into the holder and through the slot in the spindle, and means for causing said strip of flexible material to be wound first with the narrower portion of said strip upon the spindle and afterward with the wider portion of the strip around said narrower portion and over the end of the cigarette or cigar in the holder beyond the spindle.

24. The combination of a slotted spindle, means for bringing cigarettes or cigars successively and the spindle into alinement with each other, means for successively feeding blanks, narrower at one end than the other, so that the narrow end will be opposite to and will project into the slot of the spindle and the wide end will overlap the end of the alined cigarette or cigar, and means for causing relative rotary motion between the spindle and alined cigarette or cigar to wind the blank around the spindle and the alined cigarette or cigar, whereby mouthpieces may be formed upon cigarettes or cigars.

25. The combination of a slotted spindle, means for bringing cigarettes or cigars successively and the spindle into alinement with each other, means for successively feeding blanks, narrower at one end than the other, so that the narrow end will be opposite to and will project into the slot of the spindle and the wide end will overlap the end of the alined cigarette or cigar, means for causing relative rotary motion between the spindle and alined cigarette or cigar to wind the blank around the spindle and the alined cigarette or cigar, and means for causing the blank when wound to adhere to the cigarette or cigar and to itself, whereby mouthpieces may be formed upon cigarettes or cigars and be permanently secured in place.

In testimony whereof I have signed my name to this specification in the presence of two subscribing witnesses.

GEORGE PIERCE BUTLER.

Witnesses:
E. A. HARVEY,
EDWIN SEGER.